United States Patent [19]

Irwin

[11] 4,177,692
[45] Dec. 11, 1979

[54] SHAFT BALANCING
[75] Inventor: John A. Irwin, Greenwood, Ind.
[73] Assignee: General Motors Corporation, Detroit, Mich.
[21] Appl. No.: 854,759
[22] Filed: Nov. 25, 1977
[51] Int. Cl.² ............................................. F16F 15/22
[52] U.S. Cl. .................................................. 74/573 R
[58] Field of Search .................... 74/572, 573; 64/1 V

[56] References Cited
U.S. PATENT DOCUMENTS

| | | | |
|---|---|---|---|
| 1,645,343 | 10/1927 | Moorhouse | 74/573 |
| 3,159,050 | 12/1964 | Wilson | 74/573 |
| 3,528,316 | 9/1970 | Hammer | 74/573 |
| 3,916,495 | 11/1975 | Klassen et al. | 74/573 |
| 4,059,972 | 11/1977 | Beam, Jr. et al. | 74/573 |

Primary Examiner—Samuel Scott
Assistant Examiner—Wesley S. Ratliff, Jr.

Attorney, Agent, or Firm—J. C. Evans

[57] ABSTRACT

A gas turbine engine has an internal drive shaft including one end connected to a driven load and an opposite end connected to a turbine wheel and wherein the shaft has an in situ adjustable balance system near the critical center of a bearing span for the shaft including two 360° rings piloted on the outer diameter of the shaft at a point accessible through an internal engine panel; each of the rings has a small amount of material removed from its periphery whereby both of the rings are precisely unbalanced an equivalent amount; the rings are locked circumferentially together by radial serrations thereon; numbered tangs on the outside diameter of each ring identify the circumferential location of unbalance once the rings are locked together; an aft ring of the pair of rings has a spline on its inside diameter that mates with a like spline on the shaft to lock the entire assembly together.

1 Claim, 7 Drawing Figures

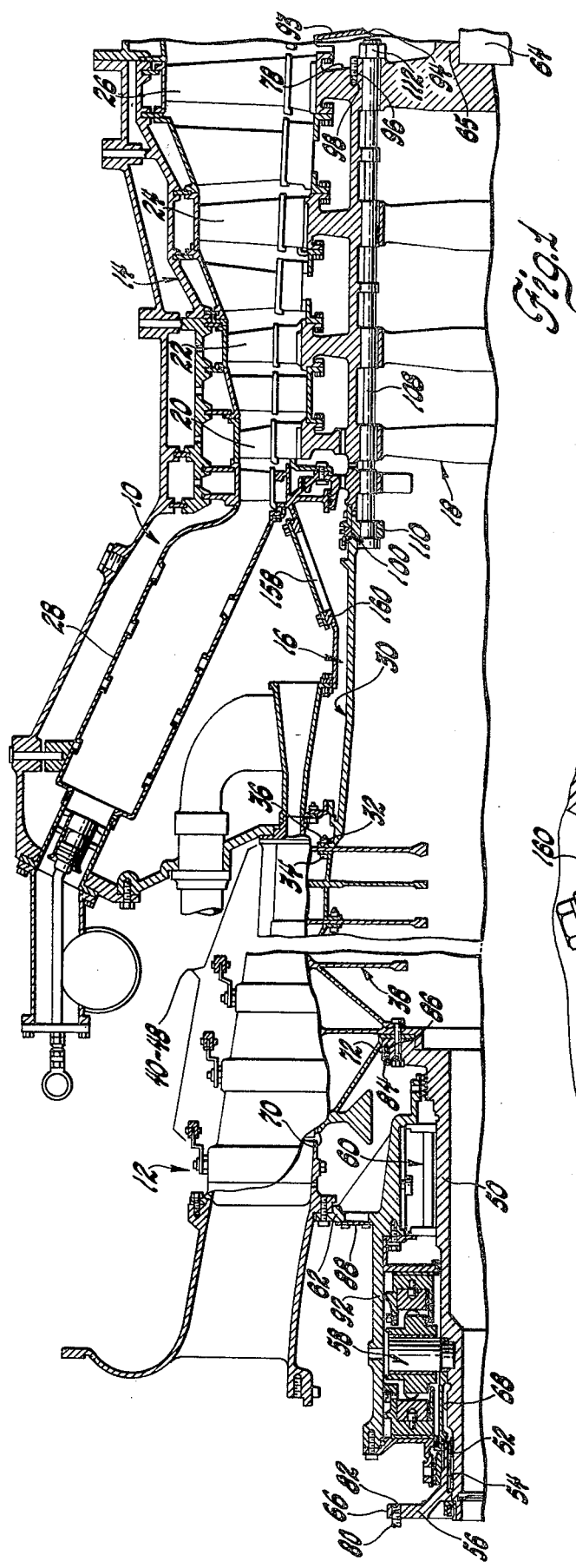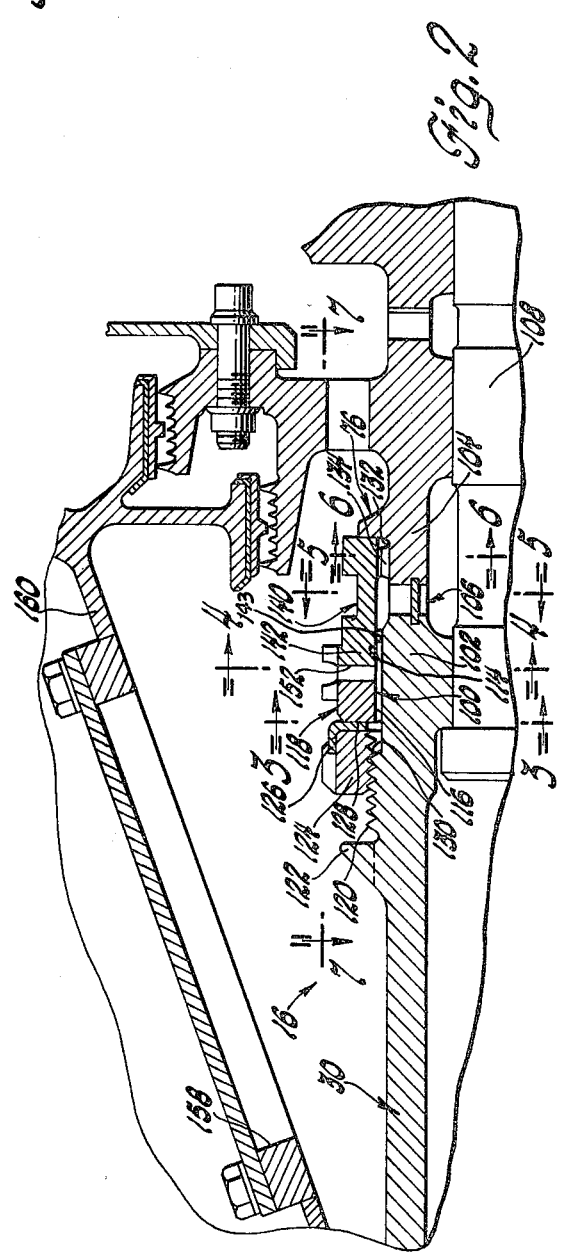

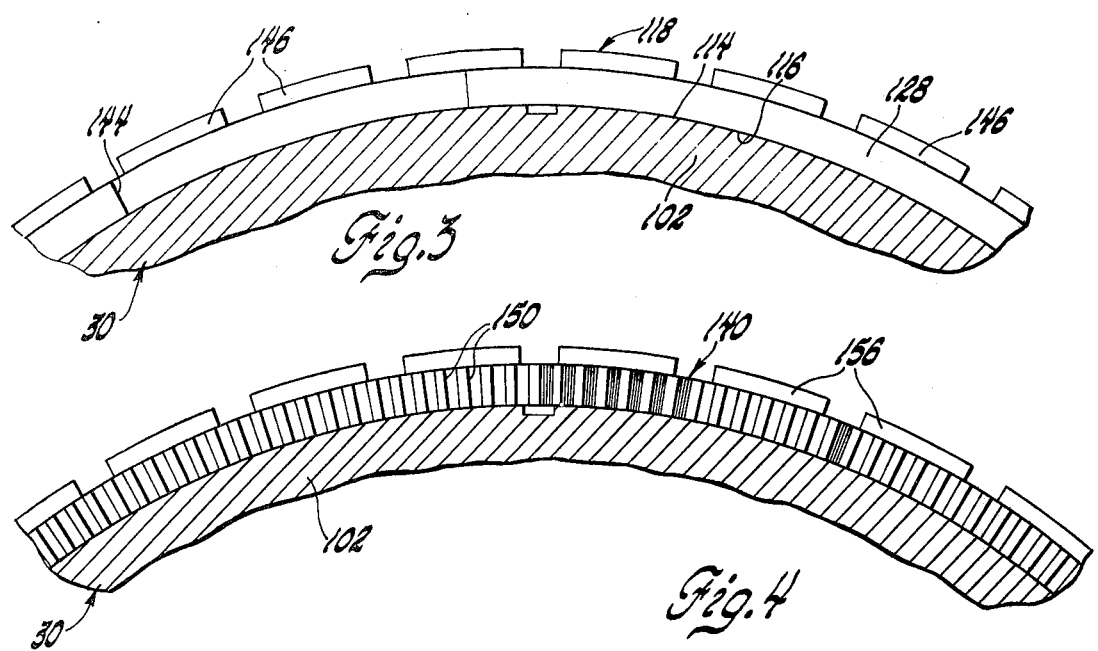
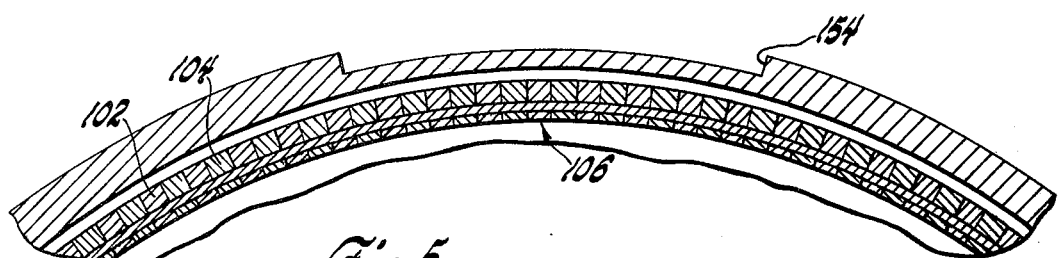
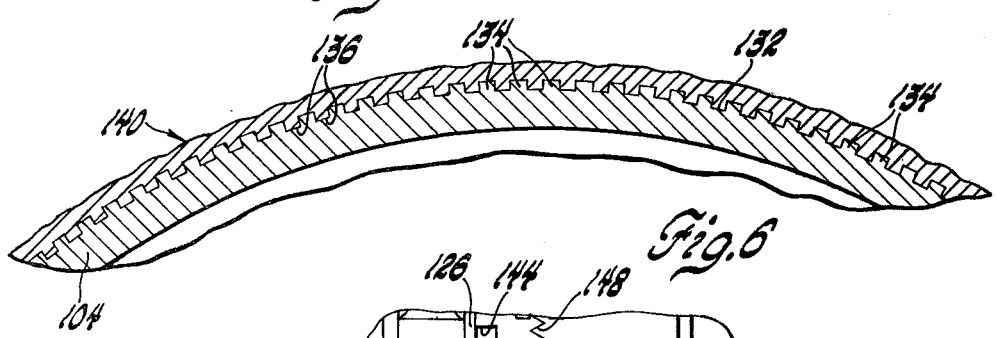
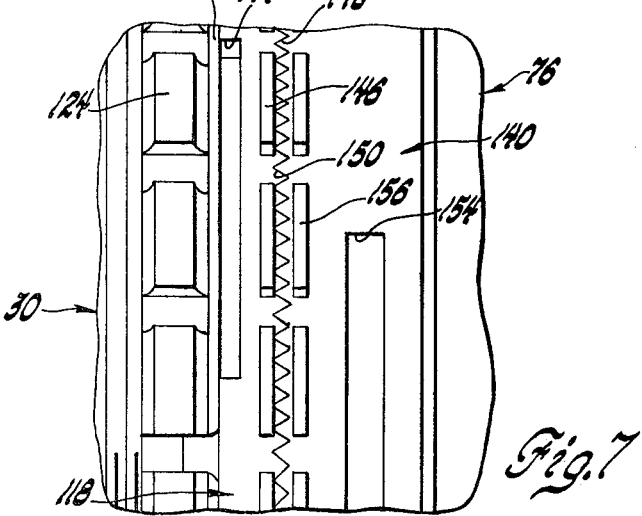

SHAFT BALANCING

The invention herein described was made in the course of work under a contract or subcontract with Energy Research Development Administration (ERDA) of the United States Government.

This invention relates to rotary shaft assemblies and more particularly to balance weight assemblies thereon for dynamically balancing a rotating shaft assembly in multiplanes during its operation.

Various proposals have been suggested for adjusting or fine tuning the balance of a rotating shaft in a gas turbine engine. For example, one such arrangement is set forth in U.S. Pat. No. 3,964,342, issued June 22, 1976, to Beam Jr. et al. In such arrangements, it is recognized that in high speed turbine engines the engine shaft can be operated at a super critical speed, a speed above that at which the number of revolutions per second of the shaft is equal to the frequency of the natural vibration of the shaft.

Accordingly, an object of the present invention is to provide an improved system for multiplane balancing of a shaft operated at super critical speed and to do so by the provision of an improved multi-balance plane system for a gas turbine rotor shaft assembly including known balance adjustment systems at given ones of the multiple planes and by the further provision of an improved in situ balance adjustment system on a rotor assembly and wherein the in situ balance adjustment system includes two 360° rings piloted on the O.D. of the rear end of the cone shaft and including means for locking them together at a circumferentially adjusted relationship and with each of the rings including a configuration for forming a precise point of unbalance thereon and a plurality of radially outwardly directed identification tangs thereon showing the exact location of the unbalance point on the rings when they are locked together and wherein the rings are axially adjustable on the shaft O.D. and wherein coacting spline means on one of the rings and the shaft O.D. will selectively index the in situ balance system on the shaft to establish a fixed reference point for adjustment of the second ring with respect to the first ring and wherein lock means are provided on the shaft to lock the ring components together and to the shaft when they are properly adjusted with respect to the shaft thereby to provide precise balance.

Yet another object of the present invention is to provide an improved rotor shaft balance assembly of the type set forth in the preceding object wherein the inner shaft is located within an engine panel having a segment thereon located in surrounding relationship to the special balance adjustment system set forth in the preceding object and wherein an access plate is provided in the panel segment for permitting tool access so that the two adjustment rings can be disconnected from one another and the spline means so that unbalance locations thereon are diametrically opposite one another to cancel out the unbalance and thereafter the rings can be positioned on the shaft with the fastening nut backed off so that the pair of rings can be engaged with the spline means on the O.D. of the shaft at a specific indexed location and the lock means can be tightened and secured; following which the rotor is balanced with material being removed or added to achieve desired balance; thereafter, following engine assembly, the balance assembly lock means can be backed off and one ring may be adjusted circumferentially with respect to the other ring to adjust the amount of unbalance at the balance plane; furthermore, the two rings together may be moved circumferentially with respect to the shaft by disengaging them from the spline means to adjust the location of the unbalance.

Still another object of the present invention is to provide an improved balance adjustment feature for fine tuning shaft balance at a balance plane near the critical center of a gas turbine engine rotor bearing span by the provision of a cone shaft having an aft coupling thereon and a seal disc member interconnected axially by means of a curvic coupling with the cone shaft and seal disc member being connected together by axially oriented fastener means; the cone shaft and seal disc member each having an outer peripheral groove thereon to supportingly receive a pair of balance rings one of which is selectively spline coupled at index splines on the outer peripheral groove of the seal disc member at a specific axial location thereon and the other of which is axially slidable to release the first disc from its indexed position and wherein both of the rings include coacting means thereon to produce a controlled circumferential location therebetween; each of the rings having a plurality of tangs around the outer diameter to identify the exact location of a precisely equal amount of unbalance on each of the rings and wherein means are included so that when the engine is assembled a lock nut may be backed off to enable the other ring to be adjusted circumferentially with respect to the one ring to adjust the amount of unbalance at the balance plane in the critical center of the bearing span of the rotor assembly and where further means are provided so that one ring can disconnect from spline couple whereby the two balance rings can be moved as a unit circumferentially with respect to the shaft to adjust the location of the unbalance in the plane with respect to the index splines on the seal disc peripheral groove following which the rings are connected together and to the index splines by means of a lock nut threadably secured on the cone shaft for movement between a ring release and a ring lock-index position thereon.

Further objects and advantages of the present invention will be apparent from the following description, reference being had to the accompanying drawings wherein a preferred embodiment of the present invention is clearly shown.

FIG. 1 is a longitudinal view of a gas turbine shaft rotor assembly including the in situ shaft balancing system of the present invention;

FIG. 2 is an enlarged sectional view of a critical center of a bearing span in the system of FIG. 1 showing a longitudinal cross section of the in situ balance adjustment system of the present invention;

FIGS. 3-6 are vertical sectional views taken along the lines 3—3 through 6—6 of FIG. 2; and FIG. 7 is a fragmentary elevational view of the balance rings of the assembly along line 7—7 of FIG. 2.

Referring now to the drawings, a gas turbine engine 10 is illustrated including a compressor section 12 at the front of the engine and a turbine section 14 at the rear thereof. The illustrated engine is characterized by having an operating mode where a load drive shaft therein is operated above a critical speed wherein the number of operating revolutions per second of the shaft is equal to the frequency of its natural vibration.

During such modes of operation, it is necessary to precisely balance the power shaft and associated rotor components to avoid resonant frequency conditions of operation that would result in excessive stresses in the rotor assembly components.

More particularly, in the illustrated arrangement the engine includes a rotor shaft assembly 16 having a turbine rotor 18 at one end thereof with turbine blade stages 20-26 which receive combustion products from a combustor assembly 28 that has air supplied thereto from the compressor section 12 which is driven by the turbine. Turbine stages 20-26 are connected to a radially inwardly located cone shaft 30 extending through the engine to a point forwardly of the engine where a connection flange 32 thereof is connected by means of fastener screws 34 and nuts 36 to a compressor rotor 38 with stages 40-48. Rotor 38 is coupled to one end of a drive shaft 50 adapted to be connected to an external load. The shaft 50 has splines on its outboard end that are connected to internal splines 54 of a coupling flange 56 which is telescoped over the outboard end of the output shaft 50 to extend axially thereof from the front of the engine. The shaft 50 is supported by a pair of axially spaced assemblies 58, 60 with respect to a forward bulkhead 62 of the engine 10.

The rotor shaft assembly is supported at its aft end by a bearing assembly 64 that supportingly receives an aft extension 65 of the fourth stage 26 of the turbine section 14. Accordingly, the rotor and shaft assemblies define a longitudinal drive system through the engine 10 between the turbine section 14 thereof and the compression section 12 thereof.

In systems of the aforesaid type it is recognized that engine operation can cause the rotating mass of the shaft and rotors to be operated at a super critical speed wherein the turbine shaft will be driven at a speed which equals the frequency of the natural vibration of the shaft so as to produce possible resonant frequencies within the shaft.

In order to obviate this problem and to assure the best possible balancing procedure, in the illustrated engine seven balance planes are established on the rotor shaft assembly for eliminating vibration and stress problems at the critical speed ratio of the engine. More particularly, the planes are located as follows:

1. Drive shaft coupling flange 56, outer diameter 66.
2. Drive shaft plane 68, aft of spline 52.
3. Compressor first stage 40, wheel rim 70.
4. Drive shaft 50, rear flange outer diameter 72.
5. Cone shaft 30, forward flange 32.
6. Cone shaft 30, rear end and seal disc 76.
7. Fourth stage turbine 26, disc rear face 78.

The balance adjustment at these points can be accomplished by either removal of material from the part or addition of balance weight thereto during assembling balancing of the shaft rotor assembly 16. Furthermore, certain of the planes are accessible for "in situ" balance adjustment for fine tuning of rotor dynamics.

More particularly, the plane including the outer diameter 66 of the coupling flange 56 is accessibly located exteriorly of the engine so that parts of located Phillip head set screws 80 can be threadably received in tapped bores 82 therein and then staked in place after installation. Likewise, the drive shaft rear flange outer diameter 72 is accessible to locate Phillip head set screws 84 thereon of different length and weight which are staked in place in tapped bores 86 in flange outer diameter 72 after installation of shaft 50.

A special access door 88 is provided in the front bearing housing 92 to provide access to the set screws 84 for fine tuning of the rotor dynamics in planes including these components. A like access door 93 is found on rear support 94 to give access to like diametrically located set screws 96 in tapped holes 98 in face 78.

The present invention is in association with a system using the aforesaid method and is located at the item 6 plane in the aforesaid tabulation of balance planes. The plane is at the rear end of cone shaft 30 and at seal disc 76. More particularly, the item 6 plane is located near the critical center of the bearing span of the shaft rotor assembly 16. The plane is balanced by means of a special in situ balance adjustment assembly 100 that is supported in part by the cone shaft rear end 102 and by a seal disc stub 104 that is coupled thereto by means of a curvic coupling 106 between end 102 and stub 104.

Axially directed tie rods 108 are directed through a circumferential connector flange 110 on the inside diameter of the cone shaft 30 into threaded engagement with a nut 112 to fixedly secure the component parts of rotor 18 together. The cone shaft rear end 102 includes an outer peripheral surface 114 thereon on which is supportingly received the inner periphery defined by a smooth inner bore 116 of a first balance ring 118 which extends through its axial length. The cone shaft rear end 102 further includes an externally threaded segment 120 thereon located aft of a stop flange 122 that serves as a reference surface for a lock nut 124 and lock ring 126. The threaded segment 120 has an axial length that enables lock nut 124 to be threaded onto the rear end 102 of the cone shaft until it abuts against the stop flange 122 at which time the first balance ring 118 can be moved into an axially offset position where an inboard wall 128 thereon will abut against the aft end 130 of the threaded segment 120.

The lock nut 124, lock ring 126 and first balance ring 118 are assembled on the cone shaft rear end 102 prior to connection of the curvic coupling 106.

The seal disc stub 104 includes an outer peripheral surface 132 thereon with a plurality of externally formed axial splines 134 that interlockingly connect to axially extending internal splines 136 on the inside diameter of a second balance ring 140 that includes a fore segment 142 with a smooth internal bore 143 at one end of the ring 140 slidably supported by the outer peripheral surface 114 on the cone shaft rear end 102. The second balance ring 140 is axially adjustable with respect to the first balance ring 118 when the lock nut is against the stop flange 122 so as to disconnect the splines 134, 136.

Referring now more particularly to the first balance ring 118, it is a 360° ring piloted on the outer surface 114 which constitutes the O.D. of the rear end of the cone shaft 30. The balance ring 118 includes an undercut segment 144 which is a precise amount of unbalance at a precise asymmetrical point on the ring 118. Furthermore, ring 118 includes a plurality of numbered tangs 146 on its outer periphery that identify the exact location of the segment 144 on the outer periphery thereof.

Furthermore, the ring 118 includes a plurality of radially outwardly directed serrations 148 on the face thereof that are selectively connected with a like plurality of serrations 150 on the inboard surface 152 of the second balance ring 140. The second balance ring or aft ring 140 also has a small amount of unbalance defined by an undercut segment 154 that is precisely the same amount of asymmetrical unbalance as the unbalance on the first ring. Likewise, the ring 140 includes a plurality of circumferentially spaced tangs 156 on its outer periphery that also identify the exact location of the unbalance undercut 154 in a circumferential sense.

By virtue of the aforesaid arrangement, during assembly, the two rings 118, 140 can be aligned so that the unbalance locations defined by undercuts 144, 154 thereon are located opposite each other to cancel out unbalance. When they are in this position they are installed on the cone shaft end 102 with the nut 124 in its backed off position against the stop flange 122. Thereafter, the cone shaft 30 is mated by the seal disc curvic coupling 106 to rotor 18 during rotor assembly. The pair of rings 118, 140 are then positioned so that ring 140 is engaged with the spline 134 on the seal disc 104 at a specifically indexed location. Thereafter, the lock nut 124 can be tightened against the inboard wall of the first balance ring 118.

Once the engine is finally assembled following rough balance of the rotor and shaft assembly 16, access is available through an access port 158 in a radially outwardly divergent section 160 of an internal engine panel. The access port 158 can be reached from outside the assembled engine to enable a tool to be inserted so that the lock nut 124 can be backed off and the balance ring 118 can be moved axially forwardly within the engine to separate the serrations 148, 150. The first balance ring 118 can be adjusted circumferentially with respect to the second or aft balance ring 140. Thereafter, the two rings can be shifted axially together to join the serrations 148, 150 thereon so that the two rings, with an adjusted amount of unbalance produced by moving the unbalance undercuts 144, 154 from their aligned diametric relationship, may further be moved circumferentially with respect to the cone shaft rear end 102 by disengaging the splines 134, 136 and changing the connected balance rings 118, 140 to a different desired indexed relationship with respect to the seal disc spline 134. The lock nut and lock ring 124, 126 can then be retightened and secured to lock the rings in their reset position. Threaded segment 120 is a left hand thread to insure that engine rotation will tend to tighten the lock nut 124 to maintain the aforedescribed arrangement in its finally adjusted position to produce in situ balance adjustment and fine tuning of the rotor dynamics of the gas turbine engine after its assembly.

While the embodiments of the present invention, as herein disclosed, constitute a preferred form, it is to be understood that other forms might be adopted.

The embodiments of the invention in which an exclusive property or privilege is claimed are defined as follows:

1. A gas turbine engine rotor shaft balancing assembly comprising: a shaft having first and second segments each having an outer peripheral surface thereon spaced from one another, a coupling joining said shaft segments, one of said shaft segments including a plurality of external splines at one end thereof, a first balance ring having a first precise unbalance located thereon, said first balance ring having a first smooth inner bore at one end thereof supportably received on the peripheral surface of the other of said shaft segments and internal splines at the opposite end thereof and for axial adjustment into and out of interlocked engagement with said external splines, a second balance ring having a second smooth inner bore throughout its axial length slidably supported on the peripheral surface of the other of said shaft segments and having a second precise unbalance thereon, coacting serration means on said first and second balance rings for axially joining and separating said first and second balance rings for rotatable adjustment relative to one another to circumferentially locate said first and second unbalances at a relatively fixed rotatable joined position therebetween, said first and second balance rings when in their joined position having their smooth inner bores rotatable on said other of said shaft segments when said first balance ring is out of interlocked engagement with said external splines thereby to circumferentially position said relatively fixed joined first and second balance rings with respect to said shaft for correcting shaft unbalance, means for shifting said first and second balance rings axially on said shaft when said relatively fixed first and second precise unbalances are rotatably adjusted with respect to the shaft to balance said shaft, a housing surrounding said shaft and said first and second balance rings thereon accessible from exteriorly of said engine and including an access port therein overlying said shaft and said first and second balance rings thereon, a removable panel on said housing covering said access port to prevent the entrance of foreign matter interiorly of said housing, said panel being removable whereby said first and second balance rings can be adjusted both axially and rotatably both with respect to one another and with respect to said shaft to produce in situ balancing of the shaft without disassembly from an axially fixed running location within a gas turbine engine.

* * * * *